UNITED STATES PATENT OFFICE.

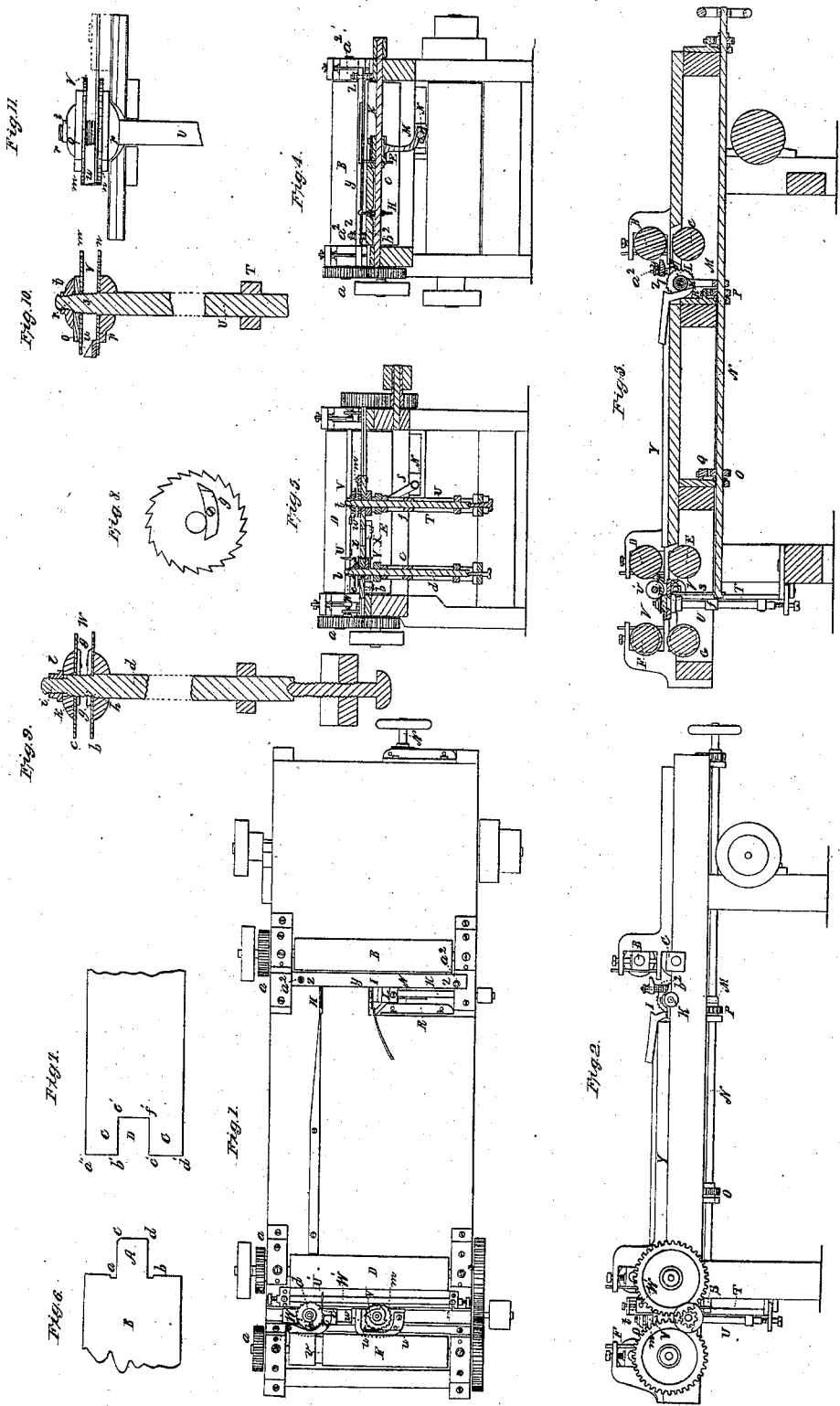
N. G. Norcross,
Planing and Matching Machine.
N° 10,844.
Patented May 2, 1854.

NICHOLAS G. NORCROSS, OF LOWELL, MASSACHUSETTS.

DEVICE FOR TONGUING AND GROOVING LUMBER.

Specification of Letters Patent No. 10,844, dated May 2, 1854.

*To all whom it may concern:*

Be it known that I, NICHOLAS G. NORCROSS, of Lowell, in the county of Middlesex and State of Massachusetts, have invented certain new and useful Improvements in Machinery for Making Grooves and Tongues in Boards; and I do hereby declare that the same is fully described and represented in the following specification and the accompanying drawings, letters, figures, and references thereof.

Of the said drawings, Figure 1, denotes a top view of a machine for jointing, tonguing and grooving boards and provided with my improvement. Fig. 2, is a side elevation of it. Fig. 3, is a vertical, central and longitudinal section of it. Fig. 4, is a vertical and transverse section taken through the jointing saws and representing the feed rollers. Fig. 5, is a vertical and transverse section taken through the tonguing and grooving cutters or saws and exhibiting the roller slitting cutters.

The frame or bench of the machine is shown at A, and it carries three sets of feed rollers, as seen at, B C, D E, F G, the rollers of each set being geared together by the gears as seen at, $a$ $a$, &c. in Figs. 1 and 4.

In front of the first set of feed rollers, are two circular saws, H, I, which extend up through the bench and rise above the top surface of the table a distance a little greater than the thickness of any board the machine is calculated to reduce. One of these saws is firmly fixed on its shaft K, while the other is attached to a tubular shaft, L, which slides on the shaft, K, and has a feather connection by which it and the saw may be rotated by the shaft, K. An arm M, extended upward from a long horizontal shaft, N, (which passes through and freely revolves in it) embraces the tubular shaft and enters a groove made around it. Fixed on the shaft, N, are two pinion gears, O, P, which respectively engage with two stationary toothed racks, Q, R. When the shaft, N, is put in rotation, it is made by the racks and pinions to move in a transverse direction at the same time and so as to simultaneously and equally move the saw I, and the grooving cutters, the shaft, N, passing through another arm, S, that extends down from a carriage, T, by which the upright shaft, U, of the grooving cutters is sustained. These grooving cutters are seen at, V, while the tonguing cutters are seen at, W, in the drawings, both sets of cutters being arranged horizontally between the two sets of feed rollers, D E, and, F G.

Just in advance of the second set of feed rollers, D E, and between the same and the tonguing cutters are two circular knives, U', V', which are respectively mounted on two horizontal and parallel shafts, W', X, that are rendered capable of freely rotating in their supports. One of these circular knives is arranged directly over and in the same plane with the other, and their plane is situated at a distance from the plane of the inner edge of a guide, Y, equal to the depth of the tongue to be formed on the edge of the board. The object of these circular knives is to cut into the board on each of its sides a depth equal to the thickness of the strip to be removed on each side of the tongue in order to form such tongue. This tongue is made by the joint action of the circular knives and two circular saws, $b$, $c$, that are mounted on a vertical shaft, $d$, that revolves them and is to be put in revolution by means of an endless band made to run around the periphery of a pulley, $e$. So with respect to the grooving cutters, they are similarly put in revolution by their shaft, which is to be revolved by a band made to work around a pulley, $f$, fixed on said shaft.

In the formation of a tongue on a board I make it with two channels $a$, $b$, arranged on opposite sides of and close to it, and plowed or cut in the board, B, as seen in Fig. 6, which denotes a transverse section of the tongue, the board, and the grooves, $a$, $b$.

It is by means of the two saws, that I am able to form the tongue with the grooves, $a$, $b$, such saws, being so arranged as to project the depth of each of the grooves $a$, $b$, beyond the inner surfaces of the circular knives, which are arranged in a vertical plane. The grooves, $a$, $b$, are each of a width corresponding to the thickness of the saw which forms it, and by means of the saws thus being made to pass beyond and through the paths of the circular knives, not only is there none of the fine or rough wood left in the angles of the tongue and board, but when the tongue is inserted in a groove, the channels, $a$, $b$, form spaces not only for the reception of the surplus wood or matters that may be on the sides of the tongue and be driven forward by the matched board and which would otherwise operate to prevent a close joint being formed between the boards, but they enable the wood on each side of the groove D, Fig. 7, to be pressed into them and thus serve to keep the adjacent sides of the tongue and groove in close contact, and to prevent the parts C, C, (Fig. 7), on each side of the groove from warping.

The inner surface of each saw, $b$, $c$, is provided with one or more small beveling cutters, $g$, see Figs. 8 and 9, the former figure being a view (on an enlarged scale) of the inner surface of one of the saws, while the latter is a vertical section (on an enlarged scale) of the two saws and their shaft. The object of the cutters, $g$, $g$, is to form the bevels ($c$, $d$, Fig. 6) of the corners of the tongue, A.

The lower saw, $b$, is fixed firmly to its shaft above this saw the shaft is provided with two screws, $h$, $i$, whose threads run in opposite directions, the lower one being a right threaded, while the upper one is a left threaded screw. These screws are made of different diameters, the lower screw having the larger diameter. The hub, $k$, of the upper saw $c$, is screwed on the lower screw, while a fastening nut, $l$, is screwed on the upper screw.

By means of the right threaded and left threaded screws, and their corresponding female screws cut in the hub and nut of the saw, we have the means of altering quickly the distance of the two saws apart from each other. By unscrewing the nut a little, the saw will rise up to it, as soon as the machine is set in motion, and any tendency of the upper saw to turn the nut will only cause the nut to be screwed down on its screw. By laying hold of the upper saw and turning it backward, we lower it on its screw, and we can confine it to any position thereon by simply screwing the nut down upon it.

The grooving cutters consist of two thin saws, $m$, $n$, and two thicker ones, $o$, $p$, the first two being to cut into the board so as to form the sides, $b'$, $e'$, and $c'$, $f'$, of the groove D, thereof, see Fig. 7, while the last two are to dress the edges $a'$, $b'$, and $c'$, $d'$, shown in said figure. The two saws, $n$, $p$, are made stationary on the shaft, U, while that part of the shaft which extends above them is provided with a right threaded screw, $r$, and a left threaded screw, $s$, that which is right threaded being the upper one of the two. The two upper saws, $m$, $o$, are joined together and screwed on the lower screw, while a nut, $t$, is screwed on the upper screw, the whole being seen in Figs. 10 and 11, the former of which is a sectional view of the grooving cutters on an enlarged scale, while the latter is a front elevation of them and shows the right angular knife, $u$, against which the board is forced, such knife serving to separate from the board, the piece of wood that is between the saws in the cavity, D, Fig. 7. The knife is so made as to cut on the line, $f'$, $e'$, Fig. 7, such constituting the bottom of the groove.

The two reversed screw threads on the shaft, U, enable a person to readily set the saws to cut any width of groove that may be necessary.

In order to prevent the waste strips and saw dust that are taken from the board during the formation of the tongues from choking between the front feed or draft rollers and thereby injuring or breaking the tongue, I form a groove, $v$, in and around each of the rollers, and where the strips pass between them. These grooves completely prevent the choking of the strips and saw dust, and of course prevent the accidents that would otherwise be likely to accrue therefrom. Springs, $w$, and, $x$, arranged as seen in Figs. 1 and 5, are used to keep the board down to the bench during the action of the tonguing and grooving cutters on it.

Directly over the jointing saws, or those by which a board is reduced to an equal width throughout its length, there is a presser or yielding bar, $y$, that is extended transversely over and parallel to the bench and is forced downward by means of screw nuts, $z$, $z$, working respectively on screws $a^2$, $a^2$, that extend up from the bench. This bar, $y$, rests on springs, $b^2$, $b^2$, by which it is elevated when the screw nuts are unscrewed.

In the employment of circular saws, for cutting boards, it is a general custom to rotate the upper half of the saw in a direction contrary to that in which the board is moved against the saw. In my arrangement of the saw teeth and operation of the saw, I cause their cutting edges to stand so that when rotated, they will move in the direction in which the board is moved, and not in a direction opposite thereto, as is the common practice. Under such circumstances it becomes necessary to employ a bar, $y$, to keep the board down upon the bench during the sawing operation. By such an arrangement and operation of the saw teeth and the employment of a bar as stated, I am not only able to cut the board with little or no raggedness of its edges, but I employ the saw to drive the board along, thus materially reducing the power required to feed the board through the machine in respect to what would be necessary when the saw is made to work in the opposite direction.

I am aware that a rotary planing cylinder has been arranged so as to have its cutter knives rotate in the direction in which a board was moved against it, and in such case a bar or the equivalent therefor has been employed to keep the board down upon the bench, when the cylinder has been arranged in the bench, or under the surface of the board dressed by it. I therefore lay no claim to any such disposition or operation of a rotary planing cylinder for planing boards, as the function of it is different from that of a rotary saw, the latter being made to cut entirely through a board, while the former only dresses it on one of its surfaces and cuts but a short distance below the same. The saw cuts into two opposite surfaces or through the board, and in striking out of the board it leaves a ragged edge on the surface, while in striking into it, the surface through which it enters is left smooth and without a ragged edge or pin. Now as one of the sides of the board to be tongued and grooved is usually a planed surface, and that surface must be placed downward on the bench during the operation of making the tongue and groove, it becomes desirable to have it jointed with a smooth edge, and this is done by making the teeth of the saw to run so as to cut into the surface of the board, instead of cutting out from the board and such surface. And I do not herein claim the improvement of making the tongue with two recesses as seen at $a$, $b$, Fig. 6, the same being accomplished by means of the extension of the teeth of the saws inward beyond the knives as stated, but I mean to claim—

1. Such an arrangement of the teeth of the saws with respect to the cutter knives, and for the purpose of making the tongue and such channels or recesses.

2. I also claim the mode of confining the upper saw or set of saws of either the tonguing or grooving cutters to its shaft, viz, by the combination of the two right and left threaded screws, and the screw nut, the same being substantially in manner and for the purposes of ready adjustment of the saw or saws as stated.

3. I also claim the improvement of making one or both of the draft rollers with a groove, $v$, when such roller is arranged and made to operate with respect to the tonguing cutters or saws as specified.

In testimony whereof, I have hereto set my signature this twenty-ninth day of September, A. D. 1853.

NICHOLAS G. NORCROSS.

Witnesses:
R. H. EDDY,
F. P. HALE, Jr.